United States Patent

Ono

[15] 3,643,575
[45] Feb. 22, 1972

[54] EXPOSURE-MEASURING DEVICE IN A SINGLE-LENS REFLEX CAMERA

[72] Inventor: Shigeo Ono, Yokohama-shi, Japan
[73] Assignee: Nippon Kogaku K.K., Tokyo, Japan
[22] Filed: Oct. 25, 1968
[21] Appl. No.: 770,666

[30] Foreign Application Priority Data

Oct. 31, 1967  Japan.................................42/69584

[52] U.S. Cl..................................................95/42, 95/64 B
[51] Int. Cl........................................G03b 19/12, G03b 9/02
[58] Field of Search.........................95/42, 10 C, 64 R, 64 B

[56] References Cited

UNITED STATES PATENTS

| | | | |
|---|---|---|---|
| 3,481,258 | 12/1969 | Mori et al. | 95/64 X |
| 3,495,514 | 2/1970 | Nakamura et al. | 95/42 X |
| 2,893,302 | 7/1959 | Durst | 95/42 X |

*Primary Examiner*—Joseph F. Peters, Jr.
*Assistant Examiner*—Richard L. Moses
*Attorney*—Harry G. Shapiro

[57] ABSTRACT

An exposure meter system for a single-lens reflex camera which can function either by sensing the light passing through the maximum diaphragm opening of an interchangeable lens mounted on the camera or by sensing the light which has been restricted by the diaphragm of the interchangeable lens. Light from the interchangeable lens is directed through a relay optical system to a photocell. An adjustable aperture in the relay optical system is adapted to be connected to the diaphragm ring of the interchangeable lens to adjust the sensitivity of the photocell for different aperture ratios of different interchangeable lenses. When the adjustable aperture in the relay optical system is not connected, compensating means associated with the photocell are automatically actuated to enable the exposure meter system to operate by using the diaphragm of the interchangeable lens to control the light reaching the photocell.

4 Claims, 4 Drawing Figures

INVENTOR.
SHIGEO ONO
BY Harry G. Shapiro
ATTORNEY

INVENTOR
SHIGEO ONO
BY
Harry S. Shapiro
ATTORNEY

EXPOSURE-MEASURING DEVICE IN A SINGLE-LENS REFLEX CAMERA

The invention relates to an-exposure measuring device for a single-lens reflex camera of the "through the lens" photometry type, and is more particularly directed to a device to correct for the difference in exposure readings caused when objective lenses having different aperture ratios are changed.

In a conventional camera when the light passing through the objective lens is measured, the interlocking pawl, which is provided on the diaphragm adjusting ring to interlock with the exposure meter, is at a predetermined position relative to the stopping scale. In a single-lens reflux camera of the recently developed "through the lens" (TTL) photometric system type, the position of the interlocking pawl related to an interchangeable lens may be changed with respect to the stopping scale by using the maximum aperture of such lens as a reference.

There are two types of exposure meters for measuring the intensity of light which passes through the objective lens of a single-lens reflex camera; that is, the open photometric system in which exposure is measured by opening the diaphragm to its maximum size; and the stopping photometric system in which exposure is measured by stopping down the diaphragm.

In a conventional camera, it is not possible to interlock the pawl to the exposure meter when the objective lens is at less than maximum aperture. Therefore, it is desirable and preferable for the performance of stopping photometry and open photometry to be able to interlock the pawl with the exposure meter at less than the full aperture of any of the interchangeable lenses which may be used in connection with a single-lens reflex camera.

With the open photometric system, there is the advantage that the finder can be observed in the brightest state. However, when the open F number of the interchangeable lens is changed, the sensitivity of the exposure meter is changed. As a result, adjustment must be made every time he open F number of the interchangeable lens is changed. In order to overcome this limitation, I have proposed the exposure meter for a single lens reflex camera having interchangeable lenses in my copending U.S. application Ser. No. 718,162, now U.S. Pat. No. 3,478,610, filed Apr. 2, 1968 which is characterized in that the image of the object to be formed on the position conjugate with the surface of the film is adjusted to be formed on the photoelectric element through relay lenses so that the effective F number of the whole image forming system from the camera's objective lens to the photoelectric element can be determined by the aperture stop of the relay lens group. As disclosed in the aforementioned application, the exposure meter is constructed to change the size of an aperture for the relay lenses, wherein the aperture is in interlocking relation with the diaphragm-adjusting ring for the interchangeable objective lens.

In the stopping photometric system, the stopping value of the camera's objective lens is optically interlocked, and insofar as the diaphragm or stop is concerned, it is not necessary to mechanically interlock the diaphragm to the exposure meter. However, the stopping operation must be carried out at each photographing operation. This is time consuming and cumbersome, and the finder may become darker. In spite of these limitations, when a connecting barrel or bellows attachment is employed in closeup photography, the interlocking means of the diaphragm-adjusting ring and the exposure meter is disconnected, and therefore, the stopping photometric system must be employed.

The object of this invention is to enable using a stopping photometric system with an exposure meter for an open photometric system according to which the indicated value of the exposure meter may be determined by a predetermined aperture which is not the full aperture of an interchangeable lens.

Another object of this invention is to provide a device for automatically switching from stopping photometry to open photometry by simply interchanging the camera lens.

Another object of this invention is to provide an exposure meter capable of correct photometry by removing or correcting the difference of the measured value obtained by open photometry and the measured value obtained by stopping photometry.

In accordance with the invention, it is possible to switch from open photometry to stopping photometry by providing compensating means, in the form of a filter or a correcting resistance, associated with the exposure meter's photosensitive element to correct for the difference in light reaching the photosensitive element during open photometry and during stopping photometry. The invention also permits automatic switching from open photometry to stopping photometry when the camera's diaphragm-adjusting means and the aperture stop related to the relay lenses or system are disconnected from one another. Since the photosensitive element is on the light axis of the camera's objective lens, and the photosensitive element and the image surface are in conjugated relation, the values or readings obtained by open photometry and stopping photometry are the same.

In accordance with the invention, a single-lens reflex camera of the TTL photometric system type, which has the exposure meter interlocking pawl at a predetermined position on the scale for the diaphragm, is constructed so that an exposure adjusting or correcting member or means is related to the photosensitive element of the exposure meter to enable switching from stopping photometry to open photometry automatically and in response to the position of the means for adjusting the diaphragm for the interchangeable lens.

The invention will be described with reference to the drawings illustrating a preferred embodiment thereof, in which.

Figure 1:
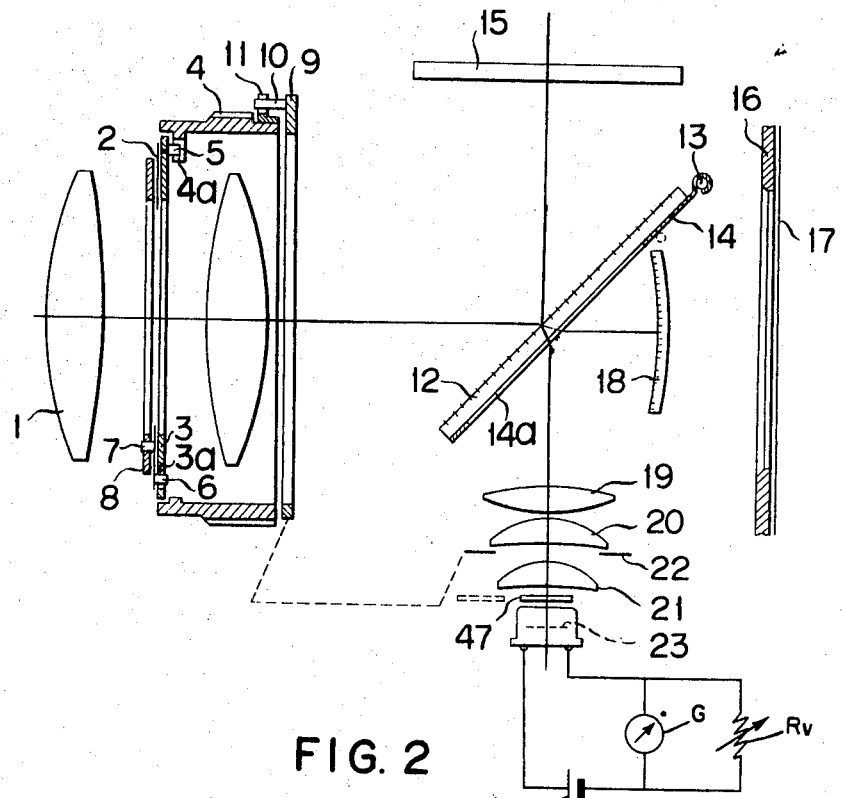
FIG. 1 is a vertical cross-sectional view showing the arrangement of the lens, mirror and photosensitive element components of the invention.

Referring to FIG. 1, a single-lens reflex camera is provided with an interchangeable objective lens 1, stopping blades or a diaphragm 2 and a diaphragm-operating ring 3, which is rotated before operation of the shutter. A manually operable diaphragm-adjusting means or ring 4 is cooperably related to the diaphragm-operating ring 3. The amount of rotation of the diaphragm-operating ring is directly or indirectly controlled by a cam or lever (not shown), depending upon the adjusted position of the diaphragm-adjusting ring.

As shown in FIG. 1, a projection 4a extends into the diaphragm-adjusting means or ring 4 to cooperate with and acts as a stop for a pin 5 on the diaphragm-operating ring 3. The diaphragm 2 is provided with oppositely extending pins 6 and 7. The pin 6 extends into a groove 3a provided on the operating ring 3, and the pin 7 is inserted in a hole of a fixed portion 8 of the lens barrel. A diaphragm interlocking ring 9 is provided on the side of the camera and is rotatable with the interlocking pawl 11 on the diaphragm-adjusting ring 4 by a fitting pin 10 extending axially from the rotatable diaphragm interlocking ring 9. A semitransparent or partially transparent reflecting mirror 12 constitutes the finder of the camera, and is mounted to rotate about a shaft 13. The mirror is supported by a plate 14 having a window 14a therein, as known in the art. When photographing, the reflecting mirror is retracted out of the light path of the camera's objective lens 1 by any conventional means. The camera also includes a focusing plate 15, an image frame 16 behind which film 17 is positioned. A concave mirror 18 which is retractably mounted is positioned between the reflecting mirror 12 and the frame 16.

Figure 3:
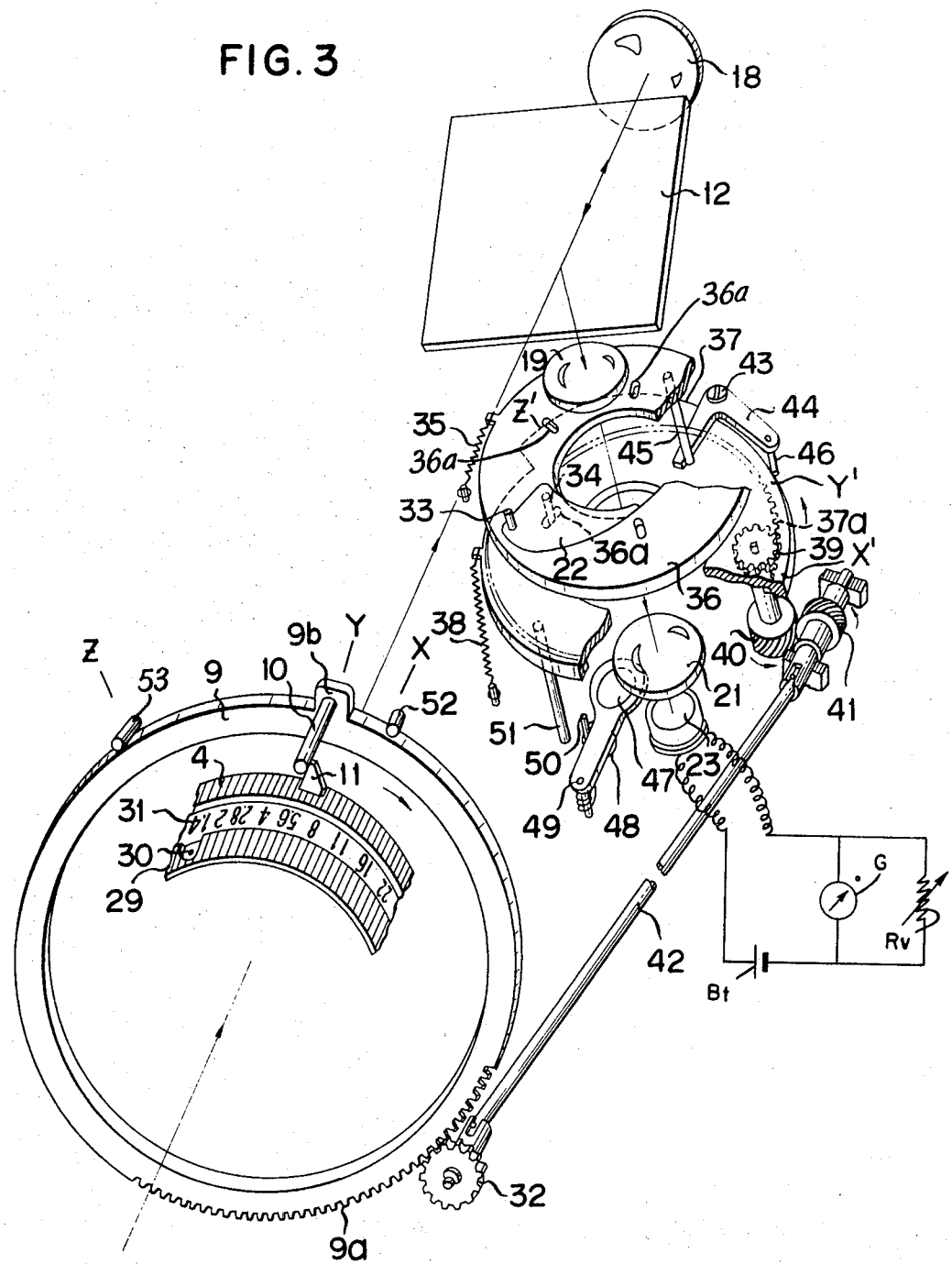
FIG. 3 is a perspective view showing the means connecting the diaphragm-adjusting means with the adjustable aperture stop of the relay optical system, and the relationship of one form of exposure-compensating means associated with the photosensitive element of the exposure meter.
Figure 4:
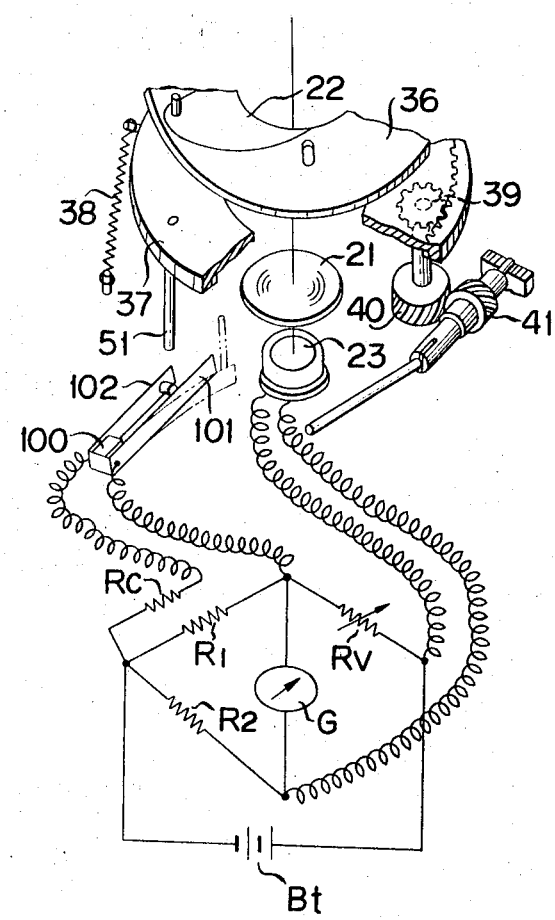
FIG. 4 is a partial perspective view similar to FIG. 3, but showing a circuit as the exposure-compensating means associated with the exposure meter's photosensitive element.

A relay optical system is associated with the photosensitive element of an exposure meter. The relay system comprises lenses 19, 20 and 21 and includes a diaphragm or an adjustable aperture stop 22. The photosensitive element is designated 23. The photosensitive element is part of a conventional exposure circuit, it being connected in series with a battery $B_t$ and a galvanometer G, a variable resistor $R_t$, being connected in parallel with a galvanometer as shown in FIGS. 3 and 4.

Figure 2:
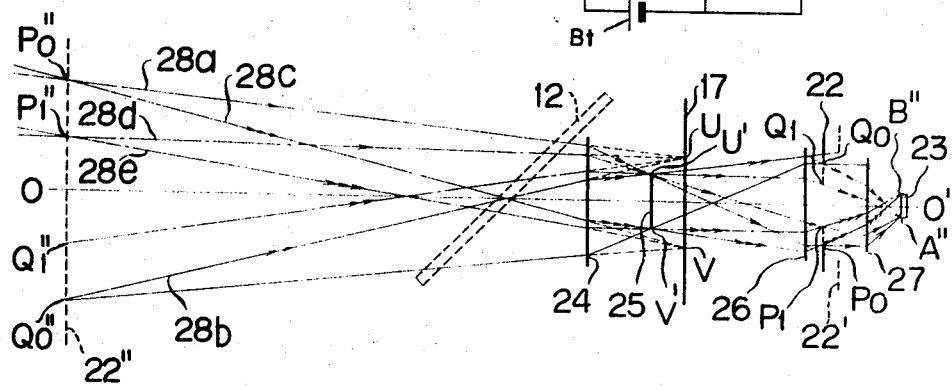
FIG. 2 is a diagram showing the optical system.

The above-described relationship of elements or components of a single-lens reflex camera as an optical system is diagrammatically shown in FIG. 2. A convex lens 24 is equivalent to the aforementioned concave mirror 18. The real image of the view formed by the camera's objective lens 1 and the concave mirror 18 is designated 25, and a lens equivalent to the combination of the relay lenses 19 and 20 is designated 26. The relay lens 21 is redesignated 27, and 22' indicates the false image which is produced by lens 26 in front of the relay lens diaphragm or aperture stop 22. The real image is indicated by 22'', such image being produced by the equivalent lenses 24 and 26 for the relay lens diaphragm 22.

As illustrated, the relay lens diaphragm 22 and the real image 22'' are in conjugated relation. The real image 25 of the view formed by the objective lens 1 and the concave mirror 18 is formed again on the photosensitive element 23 by means of the relay lens group or optical system. Thus, the photosensitive element 23 and the real image of the outer view 25 are in conjugated relation; that is, the photosensitive element 23 and the U-V portion of the film 17 (the portion or area where the intensity of light is measured), except for the areas covered by lens 24, are in the conjugated relation.

Still referring to FIG. 2, the light rays 28a and 28c show that when the relay lens diaphragm 22 is opened to maximum, the full aperture may be represented by $P_o$, $Q_o$, and when the conjugated points thereof are represented by $P''_o$, $Q''_o$, the portion (U-V) on the image to be measured is restricted by the size (A'' B'') of the photosensitive surface of the photosensitive element. Also, the effective portion ($P''_o UVQ''_o$) of the light flux coming into the portion (U-V) is restricted by the diaphragm opening designation $P_o Q_o$.

With the diaphragm-adjusting ring 4 and the aperture stop 22 of the relay lens group interlocked, the portion obtained by rotating the light rays 28a and 28c passing through $P''_o$ about the light axis O—O' may not go beyond the exit pupil of the lens having the minimum F number $F_o$. The size of the exit pupil of the respective interchangeable lenses of the corresponding F number $F_1$, which is obtained when the diaphragm is stopped to the size of $P_1 Q_1$, can satisfy the condition (1) represented by the formula (1) below. As a result, the size of the exit pupil of the respective interchangeable lenses may be larger than the range obtained by rotating 28d and 28e about the light axis O—O'.

Formula (1):

$$F_1/F_o = P''_o Q''_o / P''_1 Q''_1 \quad (1)$$

Thus, the finder has the advantage of being observable in a bright state by opening the diaphragm for the objective lens to the maximum. When a lens of a different F number is mounted it is not necessary to readjust the sensitivity of the exposure meter every time.

The foregoing principles of operation are disclosed in my aforementioned pending application.

Thus, as hereinbefore described, and in closeup photography, if a relay barrel or a bellows attachment is used, it is impossible to interlock the diaphragm-adjusting ring and the exposure meter. The effective F number of the camera's objective lens must be changed substantially, thereby necessitating the use of the stopping photometric system. It will be apparent that the F number of the whole system, from the camera's objective lens to the photosensitive element, is dependent upon the diaphragm for the objective lens. In accordance with the invention, the change of sensitivity of the exposure meter is corrected by associating compensating means with the photosensitive element to correct for the difference between the light intensity on the photosensitive element accorded by the bundle of light rays restricted by the diaphragm for the objective lens and the light intensity on the photosensitive element accorded by the bundle of light rays restricted by the aperture stop of the relay lens group or relay optical system. As will hereinafter be described, the compensating means may be in the form of a filter or a correcting resistor in circuit with a bridge circuit connected to the photosensitive element.

The theory underlying the invention may be explained as follows. Assuming that the area of the portion surrounded by (U-V) is A(cm.²), and the area of the portion surrounded by $P''_o Q''_o$ is S(cm.²), and for simplification these areas are assumed to be circles. The distance between ($P''_o Q''_o$) and (U-V) is $f$cm., and the brightness of the outer-view is set to be B($cd$/cm.²), the light flux coming into (U-V), i.e., the light flux $\phi'$ (lumens) coming into the photosensitive element 23 can be represented by the formula given below;

Formula:

$$\phi_o' = \frac{B.S.A.}{f^2} = \frac{B\pi \overline{(P''_o Q''_o)}^2}{4} \frac{A}{f^2} = \frac{\pi BA}{4(F_o')^2}$$

(in the above given formula $F_o'$ if F number when $P''_o Q''_o$ (2) is regarded as the diaphragm)

The light flux $\phi_o$ (lumens coming into the photosensitive element 23 from the camera lens whose F number is $F_o$ corresponding to the diaphragm ($P_o Q_o$) can be represented by the formula (3)

Formula:

$$\phi_o = \pi BA/4(f_o)^2 \quad (3)$$

Therefore, from the formulae 2 and 3, the formula 4 can be derived.

$$\phi_o/\phi_o' = (F_o'/F_o)^2 \quad (4)$$

Next, the light flux $\phi_1'$ (lumens) coming into the photosensitive element 23 from ($P_1 Q_1$) can be represented by the formula 5;

$$\phi_1' = \pi BA/4(f_1)^2 \quad (5)$$

(in the formula 5, $F_1'$ is the F number when $P_1'' Q_1''$ is regarded as the diaphragm).

The light flux $\phi_1$ (lumens) coming into the photosensitive element 23 from the objective lens whose F number is $F_1'$ $f_1$ corresponding to the diaphragm $P_1 O_1$ can be represented by the formula (6);

$$\phi_1 = \pi BA/4F_1^2 \quad (6)$$

Therefore, the formula (7) can be derived from the formulae 5 and 6.

$$\phi_1/\phi_1' = (F_1'/F_1)^2 \quad (7)$$

However, the diaphragm-adjusting ring of the camera lens is interlocked to the diaphragm 22 under the condition (1), and the relation represented by the formula 7 can be satisfied when the diaphragm 22 is at any stopping value, and therefore the relation represented by the formula 8 given below can be obtained.

$$\phi_o/\phi_o' = \phi_1/\phi_1' = \phi_2/\phi_2' = \ldots\ldots = K \quad (8)$$

The illumination on the photosensitive element can be obtained by dividing the incident light flux by the light-receiving area, and therefore the illumination intensity ratio is also constant (=K).

Therefore, when F number of the whole system of the exposure meter is determined by the diaphragm 2 of the camera lens, a filter, the transmittivity thereof being T=1/K is provided before the photosensitive element 23.

Referring to FIG. 3 which illustrates one embodiment of the invention, a fixed portion 29 of a barrel for the camera lens is provided with an indicator 30. A stopping scale 31 is provided on the diaphragm-adjusting ring 4 for cooperation with the indicator 30. A part of the camera's diaphragm interlocking ring 9 is formed to furnish a gear segment 9a which is in mesh with a gear 32 supported in the camera body by a bearing (not shown). The diaphragm or adjustable aperture stop 22 has pins 33 and 34 extending from opposite sides thereof. The pin 33 extends into a hole formed in the relay means barrel (not shown), and the pin 34 is positioned in a slot 36a formed in a wheel 36. The wheel 36 is urged in a counterclockwise direction by a spring 35, the spring having one end thereof connected to a projection on the periphery of the wheel and the other end being fixed to the camera body. A cam plate 37 is positioned beneath the wheel 36 and is urged in counterclockwise direction by a spring 38. The centers of the wheel 36 and the cam plate 37 are on the light axis of the relay optical system or lenses 19–21. An internal gear 37a is provided on the underside of the cam plate 37 and is in mesh with a pinion 39 fixed to one end of a stub shaft. The opposite end of the stub shaft has a right-handed screw gear fixed thereto and is in mesh with a right-handed screw gear 41. As shown, the gear 41 is connected to the gear 32 by an intermediate joint rod 42. As a result, the force of the spring 38 upon the cam plate 37 is transmitted to the interlocking ring 9 to urge it in a clockwise direction as indicated by the arrow. The wheel 36 and the cam plate 37 are interlocked by a bellcrank 44 rotatable about a pivot 43, which is mounted on the barrel portion of the relay lens group. A pin 45 is provided on the wheel 36 for cooperation with the bellcrank 44 and a pin 46 extends from the bellcrank for cooperation with the cam plate 37.

As also shown in FIG. 3, compensating means including a filter 47 is supported upon a holder having one end thereof pivotally mounted upon a shaft or pin 49. The filter is urged in a counterclockwise direction by a spring 48, the rotation of the filter in such direction being stopped by a pin 50. In such position, and as shown, the filter 47 is retracted out of the light path for photometry. The cam plate 37 has a pin 51 projecting from its underside for cooperation with the filter. A pin 52 and a pin 53 fixed on the camera body are positioned adjacent the periphery of the diaphragm interlocking ring 9 for cooperation with such ring's upstanding projection 9b.

The mechanism illustrated in FIG. 3 operates as follows. When the interlocking pawl 11 of the camera's objective lens is not fitted, the diaphragm interlocking ring fitting pin 10 is in the position designated X. Due to the resilient force exerted by the spring 38 upon the cam plate 37, the point of engagement of the bellcrank pin 46 with the cam plate 37 is at the position designated X', and the filter 47 is rotated into the light path and over the photosensitive element 23 by means of pin 51.

When an objective lens is mounted onto the camera, the interlocking pawl 11 presses against the fitting pin 10 at the final region of the fitting operation of the lens barrel, and the fitting pin 10 is displaced to the position Y. Such displacement rotates the cam plate 37 and pin 51 in the clockwise direction against the force exerted by the spring 38 through the linkage of gear 32, the joint rod 42, the gears 41, 40 and the gear 39 in mesh with the cam plate gear portion 37a, resulting in the bellcrank pin 46 assuming the positional location Y', and the filter 47 being retracted out of the light path, by means of spring 48, as shown in FIG. 3. Upon further rotation of the diaphragm-adjusting ring 4, the fitting pin 10 rotates through a diaphragm-adjusting zone designated by the Y, Z distance, and the displacement of the fitting pin 10 corresponds to the relative movement Y'-Z' of the bellcrank pin 46 with respect to the cam plate 37 to thereby correspondingly change the exposure-indicating value.

When the diaphragm-adjusting ring 4 is rotated in the counterclockwise direction, the movement is transmitted in the direction opposite to the direction shown by the arrow to rotate the cam 37 in the clockwise direction against the force of the spring 38. Such rotation of the cam plate 37 causes the wheel 36 to rotate in the clockwise direction against the force of the spring 35 through bellcrank 44, and stops down the diaphragm 22. The diaphragm adjusting ring 4 is provided with click-stops on the respective scale positions and therefore it is possible to stop at the adjusted position against the rotation caused by the spring 38.

The mounting or the removal of the camera lens is carried out by a bayonet (not shown). When the lens is turned in the clockwise direction to be removed from the camera, the interlocking ring 9 is rotated in the clockwise direction so that the projection 9b is arrested by the pin 52, and the interlocking fitting pin 10 is displaced from the point Y to X. The cam 37 is rotated in the counterclockwise direction from the position corresponding to the minimum F number of the interchangeable lens, and the pin 51 pushes the filter 47 against the force of the spring 48 to cover the photosensitive element 23, and the diaphragm 22 is kept open.

Therefore, when the interlocking is disconnected by using the relay barrel or the lens having no interlocking pawl 11, it is automatically switched over to the stopping photometric system.

FIG. 4 shows an embodiment of the invention for correcting the indicated value of the exposure meter by switching compensating resistance in an electric circuit in lieu of the correction of the indicated value of the exposure meter by the insertion or removal of a compensating filter as shown in FIG. 3. As shown in FIG. 4, Bt is a battery, G is a galvanometer, $R_1$ and $R_2$ are fixed resistors, $R_v$ is a variable resistor changed by film sensitivity (ASA) and or shutter speed; Rc is a correcting resistor for switching into open photometric system, the correcting resistor being connected in parallel with a fixed resistor $R_1$ through a switch 100. The contact piece 101 of the switch 100 is urged to be opened by the force of the spring 38 as is shown by the dotted line with the aid of the pin 51 provided on the cam 37 when the fitting pin 10 is at the position X in FIG. 3, i.e., the stage before the camera lens is fitted, and the contact of the piece 101 to the other contact piece 102 is broken. When the camera lens is mounted on the camera by bayonet means, the fitting pin 10 is rotated to the left as is shown in FIG. 3 and arrives at the point Y. Such displacement rotates the cam 37 through the gear 32, the connecting rod 42, and the gears 41, 40, 39, and 37a to move the pin 51 to the position shown by the solid line in FIG. 4. As a result, the connection of the pin 51 and the contact piece 101 is released, and the contact pieces 101 and 102 make contact, and correcting resistor Rc is connected in parallel with the resistor $R_1$, and the indicated value of the galvanometer G can be corrected.

It is believed that the advantages and improved results of the invention will be apparent from the foregoing description of several preferred embodiments of the invention. It will be apparent that various changes may be made without departing from the spirit and scope of the invention as sought to be defined in the following claims.

What is claimed is:

1. An exposure-correcting device for a single-lens reflex camera of the type having a retractable mirror constructed to receive interchangeable objective lenses, and having an exposure meter including a photosensitive element, a diaphragm for the interchangeable lenses, and a diaphragm-adjusting means, said device comprising a relay optical system having an adjustable aperture stop associated with the photosensitive element to restrict the light incident thereon; means connecting said diaphragm-adjusting means with the adjustable aperture stop whereby the adjustment of the aperture stop is responsive to the position of the diaphragm-adjusting means; said aperture stop adapted to be fully opened when said connecting means is disconnected from the diaphragm-adjusting means so that the light measurement is achieved by stopping down the diaphragm of the objective lens; and compensating means operatively associated with the photosensitive element to correct for the difference between the light intensity on the photosensitive element when the light is restricted by the aperture stop of said relay optical system in response to the connecting means and diaphragm-adjusting means and when the light is restricted by the diaphragm of the objective lens when the connecting means is disconnected.

2. An exposure-correcting device according to claim 1, wherein the compensating means is a filter.

3. An exposure-correcting device according to claim 2, including means for mounting the filter for movement over and retraction away from the photosensitive element; and wherein the filter is normally maintained over the photosensitive element 4. An exposure-correcting device according to claim 1, including a bridge circuit connected to the photosensitive element, the circuit comprising an adjustable resistor in an arm thereof and two arms each having a fixed resistor therein; and wherein the compensating means comprises a correcting resistor connected in parallel to one of said fixed resistors, and wherein the correcting resistor is connected to a switch, the switch being connected to the bridge circuit, the opening and closing of the switch being controlled by the position of the diaphragm-adjusting means.

* * * * *